(12) United States Patent
Ishizuki et al.

(10) Patent No.: US 12,554,089 B2
(45) Date of Patent: Feb. 17, 2026

(54) COLORED OPTICAL FIBER, OPTICAL FIBER RIBBON, ASSEMBLY CABLE OF SINGLE FIBERS, OPTICAL FIBER RIBBON CABLE AND METHOD FOR MANUFACTURING THE SAME

(71) Applicant: FURUKAWA ELECTRIC CO., LTD., Tokyo (JP)

(72) Inventors: Kuniaki Ishizuki, Tokyo (JP); Minoru Kasahara, Tokyo (JP); Mitsuhiro Iwaya, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 249 days.

(21) Appl. No.: 18/462,856

(22) Filed: Sep. 7, 2023

(65) Prior Publication Data

US 2023/0418015 A1 Dec. 28, 2023

Related U.S. Application Data

(63) Continuation of application No. PCT/JP2022/009599, filed on Mar. 7, 2022.

(30) Foreign Application Priority Data

Mar. 10, 2021 (JP) ................. 2021-038354

(51) Int. Cl.
*G02B 6/44* (2006.01)

(52) U.S. Cl.
CPC ........... *G02B 6/4482* (2013.01); *G02B 6/448* (2013.01)

(58) Field of Classification Search
CPC ............................. G02B 6/4482; G02B 6/448

USPC .......................................... 385/114
See application file for complete search history.

(56) References Cited

U.S. PATENT DOCUMENTS

| | | | |
|---|---|---|---|
| 2001/0008906 A1 | 7/2001 | Chawla | |
| 2006/0072890 A1* | 4/2006 | Keiko | G02B 6/02395 385/128 |
| 2016/0377802 A1 | 12/2016 | Homma | |

(Continued)

FOREIGN PATENT DOCUMENTS

| | | | |
|---|---|---|---|
| JP | 2000-241680 A | 9/2000 | |
| JP | 2002-524581 A | 8/2002 | |
| JP | 2005-162522 A | 6/2005 | |

(Continued)

OTHER PUBLICATIONS

Extended European Search Report issued Feb. 4, 2025, in corresponding European Patent Application No. 22767053.6, 9 pages.

(Continued)

*Primary Examiner* — Jerry M Blevins
(74) *Attorney, Agent, or Firm* — Oblon, McClelland, Maier & Neustadt, L.L.P.

(57) ABSTRACT

A colored optical fiber comprises a bare optical fiber, a primary layer formed of a first ultraviolet curing resin covering the bare optical fiber, and a secondary layer formed of a second ultraviolet curing resin covering the primary layer, wherein a Young's modulus of the primary layer is smaller than 70% with respect to a saturated Young's modulus of the primary layer, and wherein the saturated Young's modulus of the primary layer is smaller than or equal to 0.85 MPa.

15 Claims, 6 Drawing Sheets

(56) References Cited

U.S. PATENT DOCUMENTS

2020/0026012 A1    1/2020  Murata et al.
2020/0026013 A1*   1/2020  Murata ................ G02B 6/4482

FOREIGN PATENT DOCUMENTS

| JP | 2017-7896 A | 1/2017 |
| JP | 2021-31366 A | 3/2021 |
| WO | WO 2018/062364 A1 | 4/2018 |
| WO | WO 2018/062365 A1 | 4/2018 |

OTHER PUBLICATIONS

International Search Report issued Apr. 26, 2022 in PCT/JP2022/009599 filed Mar. 7, 2022, 3 pages.

* cited by examiner

COLORED OPTICAL FIBER, OPTICAL FIBER RIBBON, ASSEMBLY CABLE OF SINGLE FIBERS, OPTICAL FIBER RIBBON CABLE AND METHOD FOR MANUFACTURING THE SAME

CROSS-REFERENCE TO RELATED APPLICATIONS

This application is a Continuation of International Patent Application No. PCT/JP2022/009599, filed Mar. 7, 2022, which claims the benefit of Japanese Patent Application No. 2021-038354, filed Mar. 10, 2021, both of which are hereby incorporated by reference herein in their entirety.

BACKGROUND OF THE INVENTION

Field of the Invention

The present invention relates to a colored optical fiber, an optical fiber ribbon, an assembly cable of single fibers, an optical fiber ribbon cable and a method for manufacturing the same.

Description of the Related Art

In a colored optical fiber, a technique in which a primary layer and a secondary layer covering a bare optical fiber are set to a desired Young's modulus respectively by an ultraviolet curing resin (Patent Literature 1, 2) is known. Further, the Young's moduluses of the primary layer and the secondary layer rise to a saturated Young's modulus by irradiation with ultraviolet light. A technique described in Patent Literature 3, 4 ultraviolet-cures the primary layer until the Young's modulus of the primary layer becomes larger than or equal to 70% with respect to the saturated Young's modulus.

CITATION LIST

Patent Literature

Patent Literature 1: Japanese Patent Application Laid-Open No. 2005-162522
Patent Literature 2: National Publication of International Patent Application No, 2002-524581
Patent Literature 3: International Publication No. 2018-062364
Patent Literature 4: International Publication No. 2018-062365

SUMMARY OF THE INVENTION

Technical Problem

However, since the primary layer is cured to near the saturated Young's modulus, the Young's modulus becomes high, and the microbend loss cannot be effectively suppressed.

Solution to Problem

According to an aspect of the present invention, there is provided a colored optical fiber including a bare optical fiber, a primary layer formed of a first ultraviolet curing resin covering the bare optical fiber, and a secondary layer formed of a second ultraviolet curing resin covering the primary layer. A Young's modulus of the primary layer is smaller than 70% with respect to a saturated Young's modulus of the primary layer. The saturated Young's modulus of the primary layer is smaller than or equal to 0.85 MPa.

According to another aspect of the present invention, there is provided a method for manufacturing a colored optical fiber including a step of drawing a bare optical fiber from an optical fiber preform, a step of forming a primary layer by applying a first ultraviolet curing resin around the bare optical fiber, and a step of forming a secondary layer by applying a second ultraviolet curing resin around the primary layer and irradiating the ultraviolet curing resin with ultraviolet light. After manufacturing the colored optical fiber, a Young's modulus of the primary layer is smaller than 70% with respect to a saturated Young's modulus of the primary layer, and the saturated Young's modulus of the primary layer is smaller than or equal to 0.85 MPa.

Advantageous Effects of Invention

According to the present invention, there is provided a colored optical fiber capable of realizing a primary layer having a sufficiently low Young's modulus and effectively suppressing microbend loss.

DESCRIPTION OF THE EMBODIMENTS

Embodiments of the present invention will now be described in detail with reference to the accompanying drawings. In the drawings, elements having common functions are denoted by the same reference numerals, and overlapping descriptions may be omitted or simplified.

First Embodiment

Figure 1:
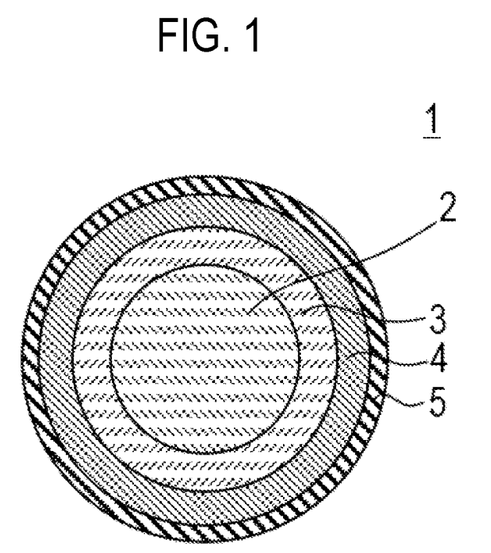
FIG. 1 is a cross-sectional view of a colored optical fiber according to a first embodiment.

FIG. 1 is a cross-sectional view of a colored optical fiber 1 according to a first embodiment. The colored optical fiber 1 includes a bare optical fiber 2, a primary layer 3 covering the outer periphery of the bare optical fiber 2, a secondary layer 4 covering the outer periphery of the primary layer 3, and a colored layer 5 covering the outer periphery of the secondary layer 4. The bare optical fiber 2 is covered with three covering layers of a primary layer 3, a secondary layer 4, and a colored layer 5. The fiber before the colored layer 5 is formed is referred to as a coated optical fiber.

The bare optical fiber 2 is formed of quartz glass or the like, for example, and transmits light. The primary layer 3, the secondary layer 4, and the colored layer 5 are formed by curing an ultraviolet curing resin by irradiation with ultraviolet light. The ultraviolet curing resin is not particularly limited as long as it can be polymerized by irradiation with ultraviolet light. The ultraviolet curing resin may be a resin that can be polymerized by photoradical polymerization or the like, for example. The ultraviolet curing resin may be an ultraviolet curing resin having a polymerizable unsaturated group such as an ethylenic unsaturated group polymerized and cured by ultraviolet light such as urethane (meth)acrylates such as polyether-based urethane (meth)acrylates and polyester-based urethane (meth)acrylates, epoxy (meth)acrylates, polyester (meth)acrylates, or the like, for example, and it is preferable that the resin have at least two polymerizable unsaturated groups. A polymerizable unsaturated group in the ultraviolet curing resin may be, for example, a group having an unsaturated double bond such as a vinyl group, an allyl group, an acryloyl group, a methacryloyl group, or the like, a group having an unsaturated triple bond such as a propargyl group, or the like. The acryloyl group and the methacryloyl group are preferable out of the groups described above in terms of polymerizability. The ultraviolet curing resin may be a monomer, an oligomer, or a polymer that initiates polymerization by ultraviolet irradiation to be cured and preferably is an oligomer. Note that the oligomer is a polymer having a degree of polymerization of 2 to 100. Further, in the present specification, the term "(meth)acrylates" means one or both of acrylates and methacrylates.

Polyether-based urethane (meth)acrylate is a compound having a polyether segment, (meth)acrylate, and a urethane bond as with a product in a reaction of polyol having a polyether framework with an organic polyisocyanate compound and hydroxyalkyl (meth)acrylate. Further, polyester-based urethane (meth)acrylate is a compound having a polyester segment, (meth)acrylate, and a urethane bond as with a product in a reaction of polyol having a polyester framework with an organic polyisocyanate compound and hydroxyalkyl (meth)acrylate.

Further, the ultraviolet curing resin may include, for example, a diluent monomer, a photosensitizer, a chain transfer agent, and various additives in addition to an oligomer and a photopolymerization initiator. As a diluent monomer, monofunctional (meth)acrylate, or polyfunctional (meth)acrylate is used. The diluent monomer here means a monomer used for diluting an ultraviolet curing resin.

The primary layer 3 is a soft layer preferably having a Young's modulus smaller than or equal to 0.60 MPa, and has a function of buffering an external force applied to the bare optical fiber 2. When the maximum Young's modulus that the resin can express is defined as "saturated Young's modulus", the primary layer 3 preferably has Young's modulus smaller than 70% with respect to the saturated Young's modulus. The secondary layer 4 is preferably a hard layer having Young's modulus of larger than or equal to 500 MPa, and has a function of protecting the bare optical fiber 2 and the primary layer 3 from external force. The colored layer 5 is colored to identify the colored optical fiber 1. Note that the colored optical fiber 1 is not limited to the configuration illustrated in FIG. 1. For example, the bare optical fiber 2 may be covered with four or more layers. Instead of the colored optical fiber 1, an optical fiber without the colored layer 5 may be used. Further, the colored secondary layer 4 may be the outermost layer of the colored optical fiber 1. When the secondary layer 4 is colored, the secondary layer 4 is colored by adding a coloring agent obtained by mixing a pigment, a lubricant, or the like to the secondary layer 4. The content of the coloring agent in the colored secondary layer 4 can be appropriately determined depending on the content of the coloring agent contained in the coloring agent, the kind of other components such as the ultraviolet curing resin, or the like.

The diameter of the bare optical fiber 2 may be larger than or equal to 80 μm and smaller than or equal to 150 μm, preferably larger than or equal to 124 μm and smaller than or equal to 126 μm. The thickness of the primary layer 3 may be larger than or equal to 5 μm and smaller than or equal to 60 μm. The thickness of the secondary layer 4 may be larger than or equal to 5 μm and smaller than or equal to 60 μm. The thickness of the colored layer 5 may be about several micrometers.

Figure 2:
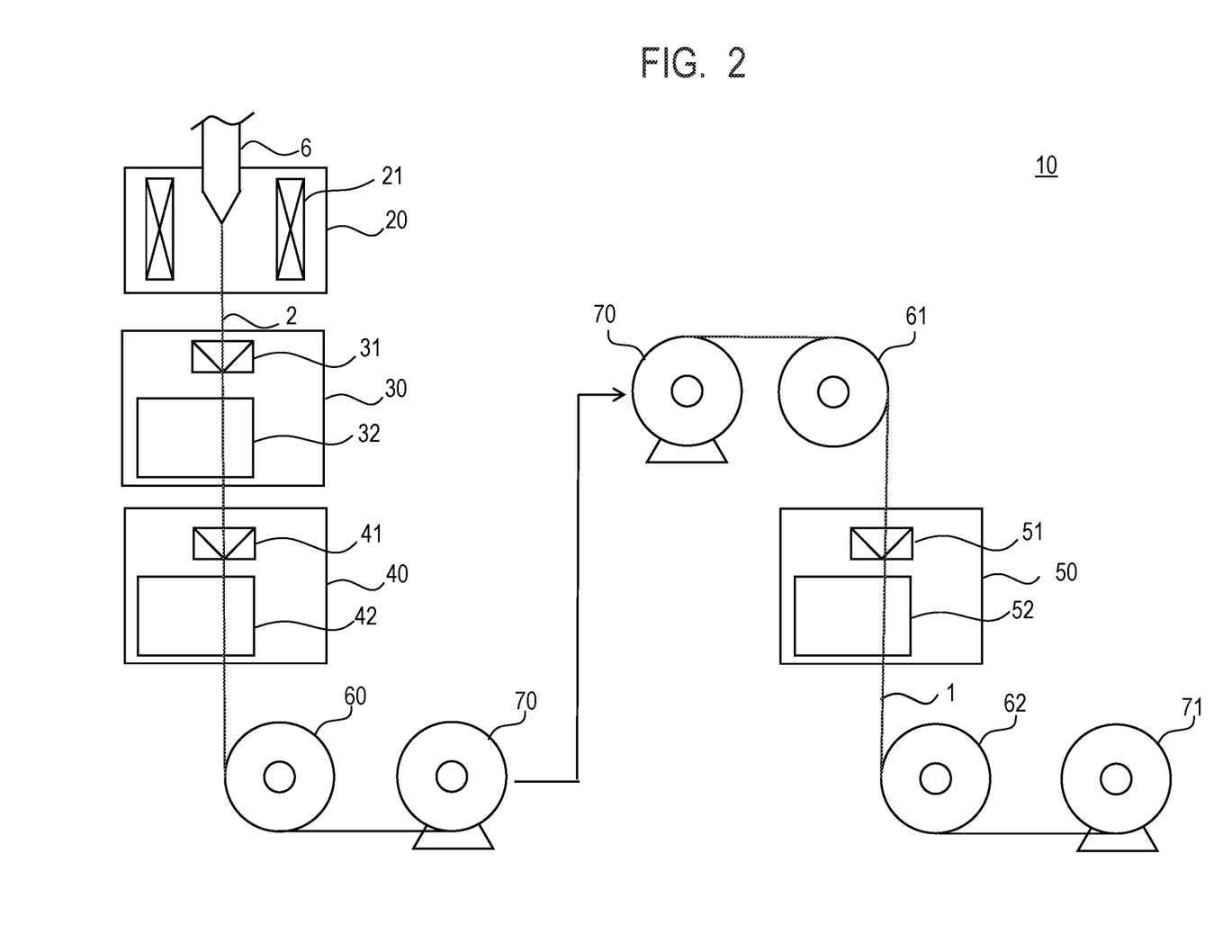
FIG. 2 is a schematic diagram of a manufacturing apparatus used in a method for manufacturing the colored optical fiber according to the first embodiment.

FIG. 2 is a schematic diagram of a manufacturing apparatus 10 used in a method for manufacturing the colored optical fiber 1 according to the first embodiment. The manufacturing apparatus 10 includes a heating apparatus 20, a primary layer covering apparatus 30, a secondary layer covering apparatus 40, a colored layer covering apparatus 50, guide rollers 60, 61 and 62, a bobbin 70 and a winding apparatus 71. The manufacturing apparatus 10 is an apparatus for manufacturing the colored optical fiber 1 from the optical fiber preform 6. The optical fiber preform 6 is made of quartz glass, for example, and is manufactured by a known method such as a VAD method, an OVD method, or an MCVD method. The heating apparatus 20 includes a heater 21. The heater 21 may be any heat source such as a tape heater, a ribbon heater, a rubber heater, an oven heater, a ceramic heater, a halogen heater, or the like. The end of the optical fiber preform 6 is heated and melted by using the heater 21 arranged around the optical fiber preform 6, and a bare optical fiber 2 is drawn by drawing.

Under the heating apparatus 20, a primary layer covering apparatus 30 is provided. The primary layer covering apparatus 30 includes a resin application apparatus 31 and an ultraviolet irradiation apparatus 32. The resin application apparatus 31 holds a covering material of the primary layer 3 (also referred to as a first ultraviolet curing resin). The first ultraviolet curing resin is applied to the bare optical fiber 2 drawn from the optical fiber preform 6 by the resin application apparatus 31. The ultraviolet irradiation apparatus 32 is provided under the resin application apparatus 31. The ultraviolet irradiation apparatus 32 includes any ultraviolet light source such as a metal halide lamp, a mercury lamp, or an UV-LED. The first ultraviolet curing resin is applied to the bare optical fiber 2 by the resin application apparatus 31 and the bare optical fiber 2 enters the ultraviolet irradiation apparatus 32, and the first ultraviolet curing resin is irradiated with ultraviolet light. As a result, the first ultraviolet curing resin containing the first ultraviolet curing resin as a main component is cured to form the primary layer 3.

Under the primary layer covering apparatus 30, the secondary layer covering apparatus 40 is provided. The secondary layer covering apparatus 40 includes a resin application apparatus 41 and an ultraviolet irradiation apparatus 42. The resin application apparatus 41 holds a covering material of the secondary layer 4 (also referred to as a second ultraviolet curing resin). The second ultraviolet curing resin is applied to the primary layer 3 by the resin application apparatus 41. The ultraviolet irradiation apparatus 42 is provided under the resin application apparatus 41. The ultraviolet irradiation apparatus 42 may have a configuration similar to that of the ultraviolet irradiation apparatus 32. The bare optical fiber 2 enters the ultraviolet irradiation apparatus 42, and the second ultraviolet curing resin is irradiated with ultraviolet light. As a result, the second ultraviolet curing resin containing the ultraviolet curing resin as a main component is cured to form the secondary layer 4. After the primary layer 3 and the secondary layer 4 are formed, the bare optical fiber 2 is guided by the guide roller 60 provided under the secondary layer covering apparatus 40, and wound around the bobbin 70. After the primary layer 3 and the secondary layer 4 are formed, the bare optical fiber 2 covered with the primary layer 3 and the secondary layer 4 is wound around the bobbin once, and then the colored layer 5 is formed.

The resin application apparatus 31 may be configured to hold the first ultraviolet curing resin and the second ultraviolet curing resin separately. In this case, the resin application apparatus 31 applies the first ultraviolet curing resin to the bare optical fiber 2, and subsequently applies the second ultraviolet curing resin to the first ultraviolet curing resin. The ultraviolet irradiation apparatus 32 irradiates the first ultraviolet curing resin and the second ultraviolet curing resin applied to the bare optical fiber 2 with ultraviolet light to form the primary layer 3 and the secondary layer 4. In this case, the manufacturing apparatus 10 does not necessarily need to include the secondary layer covering apparatus 40.

The bare optical fiber 2 wound around the bobbin 70 is guided by the guide roller 61 and enters the colored layer covering apparatus 50. The colored layer covering apparatus 50 includes a resin application apparatus 51 and an ultraviolet irradiation apparatus 52. The resin application apparatus 51 holds a covering material of the colored layer 5 (also referred to as a third ultraviolet curing resin). The bare optical fiber 2 covered with the primary layer 3 and the secondary layer 4 is covered with the third ultraviolet curing resin by the resin application apparatus 51. The ultraviolet irradiation apparatus 52 is provided under the resin application apparatus 51. The ultraviolet irradiation apparatus 52 may be configured similarly to the ultraviolet irradiation apparatus 32 and 42. The bare optical fiber 2 covered with the third ultraviolet curing resin on the outer periphery of the secondary layer 4 enters the ultraviolet irradiation apparatus 52, and the bare optical fiber 2 is irradiated with ultraviolet light. As a result, the third ultraviolet curing resin containing the ultraviolet curing resin as a main component is cured to form the colored layer 5. The primary layer 3, the secondary layer 4, and the colored layer 5 are covered with the bare optical fiber 2 to form a colored optical fiber 1. The colored optical fiber 1 is guided by the guide roller 62 provided under the colored layer covering apparatus 50 and wound by the winding apparatus 71.

Figure 3:
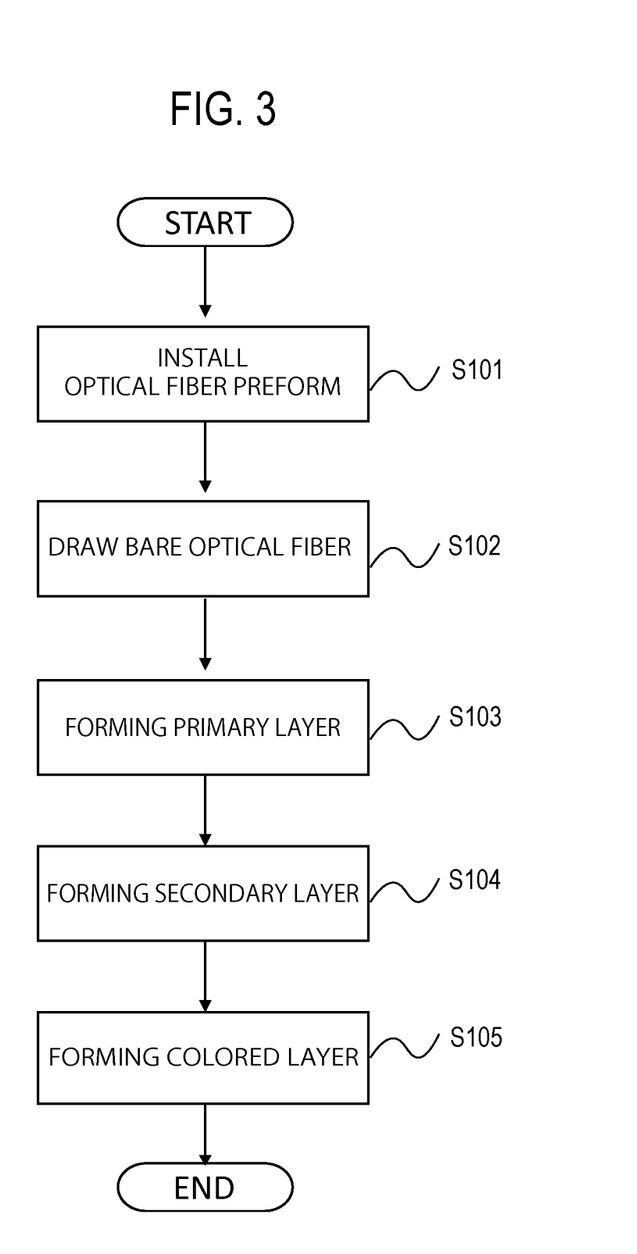
FIG. 3 is a flowchart of the method for manufacturing the colored optical fiber according to the first embodiment.

FIG. 3 is a flowchart of a method for manufacturing the colored optical fiber 1 according to the first embodiment. First, a user installs the optical fiber preform 6 in the manufacturing apparatus 10 (step S101). Next, the heater 21 provided in the heating apparatus 20 heats the optical fiber preform 6 and starts drawing the bare optical fiber 2 (step S102).

The primary layer covering apparatus 30 forms the primary layer 3 by applying a first ultraviolet curing resin around the drawn bare optical fiber 2, and irradiating the first ultraviolet curing resin with ultraviolet light (step S103). Next, the secondary layer covering apparatus 40 forms the secondary layer 4 by applying a second ultraviolet curing resin around the primary layer 3, and irradiating the second ultraviolet curing resin with ultraviolet light (step S104). Thus, a coated optical fiber is obtained. Subsequently, the colored layer covering apparatus 50 forms the colored layer 5 by applying a third ultraviolet curing resin containing an ultraviolet curing resin around the secondary layer 4, and irradiating the third ultraviolet curing resin with ultraviolet light (step S105). The colored optical fiber 1 is obtained by coating the colored layer 5 around the coated optical fiber.

In the step of forming the primary layer 3 (step S103), it is not always necessary to irradiate ultraviolet light. In this case, the primary layer 3 can be cured by irradiation with ultraviolet light in the step of forming the secondary layer 4 (step S104) or the step of forming the colored layer 5 (step S105).

In the manufacturing process of the colored optical fiber 1, the ultraviolet light irradiation is performed in the step of forming the primary layer 3 (step S103), the step of forming the secondary layer 4 (step S104), and the step of forming the colored layer 5 (step S105). Accordingly, after the primary layer 3 is formed, the primary layer 3 is irradiated with ultraviolet light even in the forming of the secondary layer 4 and the colored layer 5, and the primary layer 3 can be cured. More specifically, ultraviolet light transmitted through the secondary layer 4 and the colored layer 5 is absorbed by the primary layer 3, and curing of the primary layer 3 can proceed further. If the primary layer 3 is too cured, the Young's modulus of the primary layer 3 becomes high, and it may be difficult for the primary layer 3 to sufficiently buffer the external force applied to the bare optical fiber 2. This may result in microbend loss.

In the present embodiment, while the Young's modulus of the primary layer 3 is smaller than the saturated Young's modulus, curing of the primary layer 3 is suppressed, and microbend loss is effectively avoided. A method for suppressing curing of the primary layer 3 will be described below. The primary layer 3 is cured by polymerization of the ultraviolet curing resin contained in the first ultraviolet curing resin. The low molecular weight component contained in the first ultraviolet curing resin is partly volatilized, for example, under high temperature conditions after the drawing step (step S102). By irradiating the first ultraviolet curing resin with ultraviolet light while the first ultraviolet curing resin is at high temperature, polymerization and volatilization of the first ultraviolet curing resin proceed simultaneously. The polymerization and volatilization of the first ultraviolet curing resin proceed simultaneously, thereby suppressing the polymerization of the first ultraviolet curing resin. That is, by irradiating the first ultraviolet curing resin with ultraviolet light under the condition that the first ultraviolet curing resin is at a high temperature, progress of curing of the primary layer 3 can be suppressed, and the Young's modulus of the primary layer 3 can be kept small. At this time, the composition of the first ultraviolet curing resin is changed by volatilization of the first ultraviolet curing resin, and curing of the primary layer 3 is suppressed. In other words, the composition of the primary layer 3 is changed so as to suppress progress of curing. That is, curing of the primary layer 3 can be suppressed even when the colored optical fiber 1 is irradiated with additional ultraviolet light. The method for increasing the temperature of the first ultraviolet curing resin includes, for example, shortening the period from the end of the drawing step (step S102) to the start of the step of covering the primary layer 3 (step S103). In this case, since the first ultraviolet curing resin is applied around the bare optical fiber 2 at a relatively high temperature, the first ultraviolet curing resin can be irradiated with ultraviolet light in a state where the first ultraviolet curing resin is at a high temperature.

The method for suppressing the progress of curing of the primary layer 3 is not limited to a method for increasing the temperature of the first ultraviolet curing resin. Other methods include, for example, a method for adjusting the amount of additives contained in the first ultraviolet curing resin, and a method for adjusting the amount of ultraviolet light to be irradiated. By arbitrarily selecting or combining these methods, the method can be appropriately set so that the primary layer 3 having the required Young's modulus can be obtained.

In the present embodiment, the Young's modulus of the primary layer 3 is desirably set to smaller than 70% with respect to the saturated Young's modulus. By setting the Young's modulus of the primary layer 3 to be lower than the saturated Young's modulus, the primary layer 3 having a sufficiently low Young's modulus can be obtained, and microbend loss can be effectively avoided.

Second Embodiment

An optical fiber ribbon, an apparatus for manufacturing an optical fiber ribbon, and a manufacturing method thereof according to a second embodiment of the present invention will be described. Components similar to those of the colored optical fiber 1, the manufacturing apparatus 10 and the manufacturing method for the colored optical fiber 1 according to the first embodiment are denoted by the same reference numerals, and description thereof will be omitted or simplified.

In the present embodiment, as an example of a cable to which the colored optical fiber according to the first embodiment is applied, an optical fiber ribbon composed of the colored optical fiber according to the first embodiment will be described. An example of the application of the colored optical fiber according to the first embodiment is not limited to the form of an optical fiber ribbon, and may be, for example, a form of an assembly cable of single fibers in which the colored optical fiber is accommodated by a sheath or a form of optical fiber ribbon cable in which the optical fiber ribbon is accommodated by a sheath.

Figure 4:
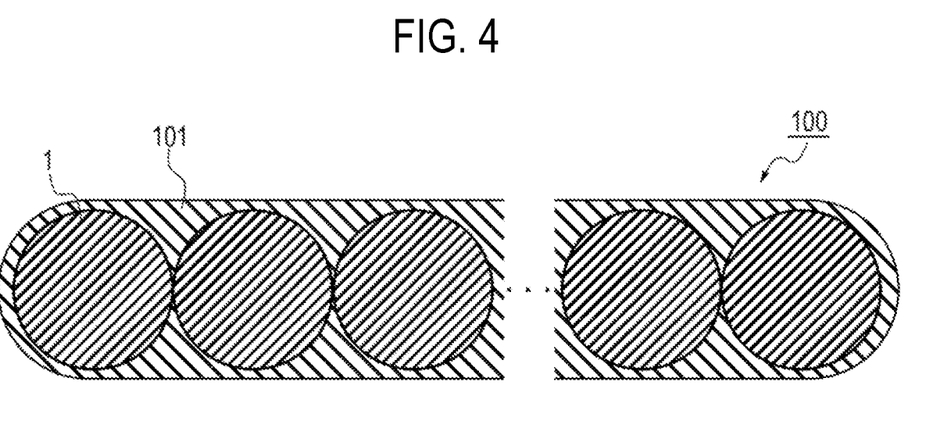
FIG. 4 is a cross-sectional view of an optical fiber ribbon according to a second embodiment.

FIG. 4 is a cross-sectional view of an optical fiber ribbon 100 according to a second embodiment. The optical fiber ribbon 100 is formed by bundling a plurality of colored optical fibers 1 in a band shape via an adhesive layer 101. The adhesive layer 101 is formed by irradiating a covering material containing an ultraviolet curing resin with ultraviolet light to be cured. The ultraviolet curing resin forming the adhesive layer 101 is made of a resin similar to the ultraviolet curing resin forming the primary layer 3, the secondary layer 4, and the colored layer 5. The colored optical fiber 1 can be bundled in high density by taking the form of an optical fiber ribbon 100. The optical fiber ribbon 100 is not limited to the configuration illustrated in FIG. 4. Further, the optical fiber ribbon 100 may take the form of an optical fiber ribbon cable accommodated by a sheath, and the colored optical 1 may take an intermittent adhesive structure in which the colored optical fiber 1 is intermittently bonded in the longitudinal direction.

Figure 5:
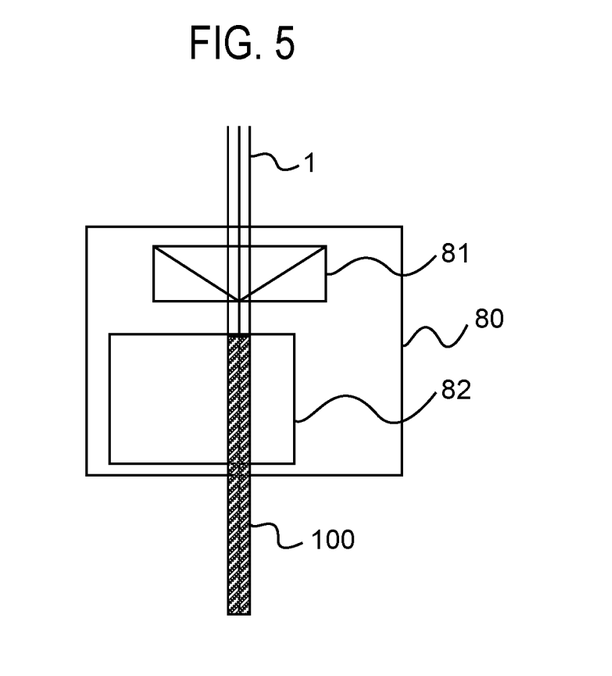
FIG. 5 is a schematic diagram of a manufacturing apparatus used in the method for manufacturing an optical fiber ribbon according to the second embodiment.

FIG. 5 is a schematic diagram of a ribbon forming apparatus 80 used in a method for manufacturing the optical fiber ribbon 100 according to the second embodiment. The ribbon forming apparatus 80 holds a covering material of the adhesive layer 101 (also referred to as a fourth ultraviolet curing resin). The ribbon forming apparatus 80 is provided with an ultraviolet light source similar to the ultraviolet light sources provided in the ultraviolet irradiation apparatuses 32, 42, and 52. A plurality of prepared colored optical fibers 1 enter the ribbon forming apparatus 80, and the fourth ultraviolet curing resin is applied thereto. The colored optical fiber 1 applied to the fourth ultraviolet curing resin is bundled together with a plurality of other colored optical fibers 1 applied to the fourth ultraviolet curing resin. The bundled plurality of colored optical fibers 1 are irradiated with ultraviolet light by an ultraviolet light source provided in the ribbon forming apparatus 80. As a result, the fourth ultraviolet curing resin containing the ultraviolet curing resin as a main component is cured to form the adhesive layer 101. A plurality of colored optical fibers 1 arranged in parallel are connected via the adhesive layer 101. In this way, the optical fiber ribbon 100 is formed from the colored optical fiber 1.

Figure 6:
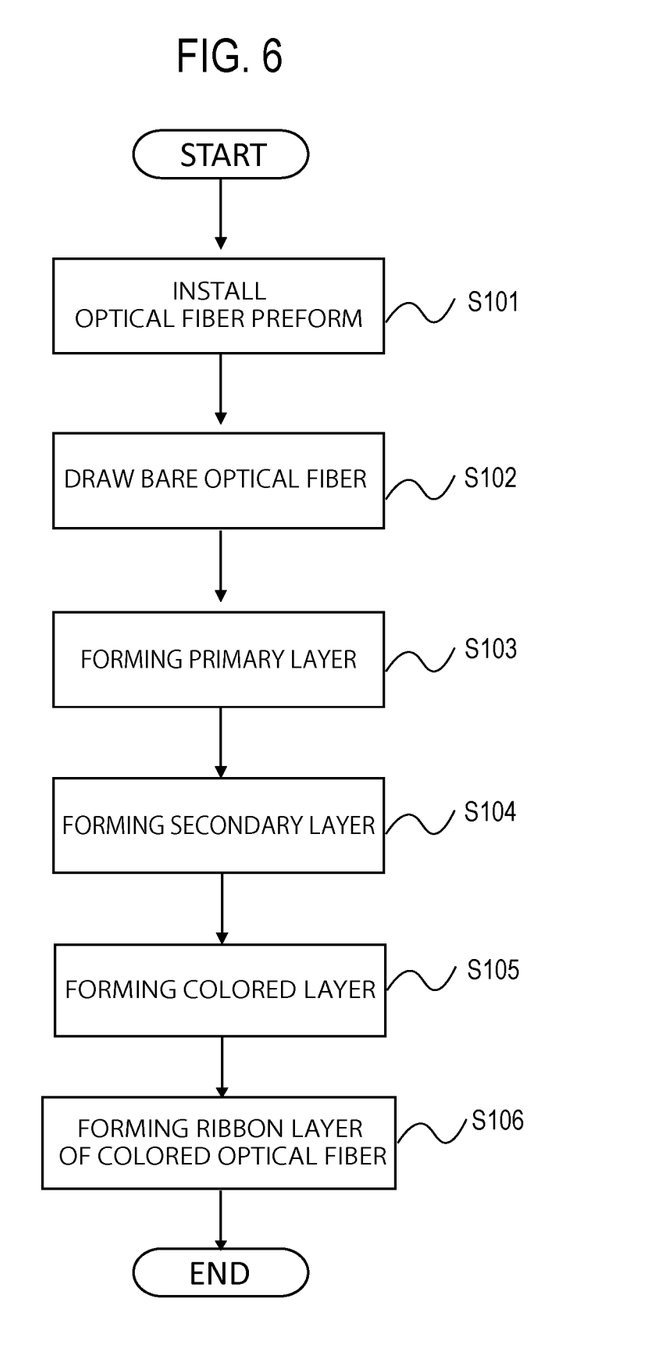
FIG. 6 is a flowchart of the method for manufacturing the optical fiber ribbon according to the second embodiment.

FIG. 6 is a flowchart of the method for manufacturing the optical fiber ribbon 100 according to the second embodiment. Steps S101 to S105 are similar to those in the first embodiment. In the flowchart of FIG. 6, in addition to the flowchart of the first embodiment, a ribbon forming step of the colored optical fiber 1 is performed. That is, after the colored layer is formed in step S105, the ribbon forming apparatus applies a fourth ultraviolet curing resin to a plurality of prepared colored optical fibers 1, and irradiates the fourth ultraviolet curing resin with ultraviolet light to connect the plurality of colored optical fibers 1 (step S106). Thus, the optical fiber ribbon 100 is manufactured.

In the process of manufacturing the optical fiber ribbon 100 from the colored optical fiber 1, the colored optical fiber 1 is irradiated with ultraviolet light. Further, the colored optical fiber 1 can suppress curing of the primary layer 3 even when additional ultraviolet irradiation is performed after manufacturing. Therefore, even in the ribbon forming step of the colored optical fiber 1, curing of the primary layer 3 due to irradiation with ultraviolet light can be suppressed. Therefore, it is possible to prevent the primary layer 3 from being ultraviolet-cured to near the saturated Young's modulus and obtain the optical fiber ribbon 100 including the primary layer 3 having a sufficiently low Young's modulus.

EXAMPLES

Hereinafter, experimental results of a colored optical fiber and an optical fiber ribbon according to an embodiment of the present invention will be described.

TABLE 1

| | Saturated Young's modulus MPa | Young's modulus MPa | Young's modulus/saturated Young's modulus % | Young's modulus after additional ultraviolet irradiation MPa | Young's modulus after additional ultraviolet irradiation/saturated Young's modulus % | Change amount of Young' modulus/saturated Young's modulus % | Evaluation 1 | Evaluation 2 | Evaluation 3 | Curing rate |
|---|---|---|---|---|---|---|---|---|---|---|
| Example 1 | 0.85 | 0.54 | 63.5 | 0.55 | 64.7 | 1.2 | OK | OK | OK | 0.84 |
| Example 2 | 0.79 | 0.54 | 68.4 | 0.55 | 69.6 | 1.3 | OK | OK | OK | 0.82 |
| Example 3 | 0.75 | 0.29 | 38.8 | 0.49 | 65.6 | 26.8 | OK | OK | OK | 0.33 |
| Example 4 | 0.51 | 0.33 | 64.3 | 0.35 | 68.2 | 3.9 | OK | OK | OK | 0.83 |
| Example 5 | 0.35 | 0.21 | 59.9 | 0.22 | 62.7 | 2.9 | OK | OK | OK | 0.75 |
| Example 6 | 0.30 | 0.13 | 43.4 | 0.19 | 63.4 | 20.0 | OK | OK | OK | 0.67 |

TABLE 1-continued

|  | Saturated Young's modulus MPa | Young's modulus MPa | Young's modulus/ saturated Young's modulus % | Young's modulus after additional ultraviolet irradiation MPa | Young's modulus after additional ultraviolet irradiation/saturated Young's modulus % | Change amount of Young' modulus/saturated Young's modulus % | Evaluation 1 | Evaluation 2 | Evaluation 3 | Curing rate |
|---|---|---|---|---|---|---|---|---|---|---|
| Comaparative Example 1 | 1.30 | 0.95 | 73.3 | 1.29 | 99.1 | 25.8 | OK | NG | NG | 0.53 |
| Comparative Example 2 | 0.71 | 0.25 | 35.0 | 0.52 | 73.3 | 38.3 | OK | OK | NG | 0.23 |
| Comparative Example 3 | 0.40 | 0.12 | 30.0 | 0.36 | 90.0 | 60.0 | OK | OK | NG | 0.60 |
| Comparative Example 4 | 0.30 | 0.08 | 26.7 | — | — | — | NG | — | — | 0.67 |

Table 1 illustrates Young's modulus of the primary layer and evaluations of the microbend loss in Examples and Comparative Examples of the colored optical fiber or the optical fiber ribbon. That is, Table 1 illustrates saturated Young's modulus (MPa), Young's modulus (MPa), Young's modulus/saturated Young's modulus (%), Young's modulus after additional ultraviolet irradiation (MPa), Young's modulus after additional ultraviolet irradiation/saturated Young's modulus (%), the amount of change in Young's modulus/saturated Young's modulus (%), curing rate, an evaluation of adhesion between the bare optical fiber and the primary layer (Evaluation 1), and evaluations of microbend loss of the colored optical fiber or the optical fiber ribbon (Evaluations 2 and 3) and the reactivity of the primary layer to ultraviolet irradiation (curing rate) in Examples 1 to 6 and Comparative Examples 1 to 4.

There are various methods of measuring microbend loss. In the present specification, a difference between a transmission loss of an optical fiber to be measured in a state A in which optical fibers having a length of greater than or equal to 400 m are wound around a large bobbin wound a sandpaper #1000 thereon in one layer so as not to overlap each other with a tension of 100 gf, and a transmission loss of an optical fiber in state B wound on the same bobbin as state A with the same tension and length as state A which is not wound around a sandpaper, is defined as a microbend loss value. Here, the transmission loss of the optical fiber in the state B does not include the microbend loss, and is considered to be a transmission loss inherent to the optical fiber itself. This measuring method is similar to the fixed diameter drum method defined in JIS C6823:2010. This measuring method is also referred to as a sandpaper method. Further, in this measuring method, since the transmission loss is measured at a wavelength of 1550 nm, the following microbend loss is also a value at a wavelength of 1550 nm.

The effective core cross-sectional area (effective core cross-sectional area) is an index indicating the easiness of microbend loss of the optical fiber. The effective core cross-sectional area is represented by the following equation (1).

[Math 1]

$$(\text{Effective core cross sectional area}) = (\pi k/4) \ast (\text{MFD})^2 \quad (\text{equation 1})$$

Here, the effective core cross-sectional area is a value at a wavelength of 1550 nm, MFD is a mode field diameter (μm), and k is a constant. The effective core cross-sectional area represents an area of a portion through which light having a predetermined intensity passes in a cross-section orthogonal to the axis of the bare optical fiber 2. Generally, the larger the effective core cross-sectional area of the bare optical fiber 2, the weaker the optical confinement in the cross section of the bare optical fiber 2. That is, when the effective core cross-sectional area of the bare optical fiber 2 is large, light in the bare optical fiber 2 tends to leak by an external force applied to the bare optical fiber 2. Therefore, when the effective core cross-sectional area of the bare optical fiber 2 becomes large, microbend loss of the colored optical fiber 1 tends to occur.

Here, the colored optical fiber 1 according to the embodiment of the present invention includes a primary layer 3 capable of effectively buffering an external force applied to the colored optical fiber 1. Therefore, by sufficiently buffering the external force applied to the colored optical fiber 1 by the primary layer 3, the external force applied to the bare optical fiber 2 can be sufficiently reduced. Thus, even when the effective core cross-sectional area of the bare optical fiber 2 is large, the microbend loss of the optical fiber can be effectively suppressed.

Further, by increasing the effective core cross-sectional area of the bare optical fiber 2, the light intensity per unit area of the cross section of the bare optical fiber 2 can be reduced. Thus, the nonlinear optical effect caused by the light in the bare optical fiber 2 can be suppressed. Accordingly, the colored optical fiber 1 of Examples 1 to 6 and Comparative Examples 1 to 4 preferably have an effective core cross-sectional area larger than or equal to 100 μm$^2$ and smaller than or equal to 160 μm$^2$, for example, larger than or equal to 120 μm$^2$ and smaller than or equal to 160 μm$^2$. Thus, it is possible to obtain the colored optical fiber 1 capable of suppressing the nonlinear optical effect caused by the light in the bare optical fiber 2.

The "saturated Young's modulus" in Table 1 is the Young's modulus when a first ultraviolet curing resin is formed into a film and irradiated with ultraviolet light at room temperature using a mercury lamp, UV-LED, or the like to be completely cured. The "Young's modulus" in Table 1 is ISM (In Situ Modulus) of the primary layer 3 of the colored optical fiber 1 or the optical fiber ribbon 100. In the present specification, ISM is defined as measured by the following method.

First, using a commercially available stripper, the primary layer and the secondary layer of the intermediate portion of the optical fiber serving as a sample are peeled off by a length of several millimeters, and then one end of the optical fiber on which the covering layer is formed is fixed on the slide glass with an adhesive, and a load F is applied to the other end of the optical fiber on which the covering layer is formed. In this state, a displacement 5 of the primary layer at the boundary between the portion where the covering layer is peeled off and the portion where the covering layer is formed is read by a microscope. Then, by setting the load F to 10, 20, 30, 50, and 70 gf (that is, 98, 196, 294, 490, and 686 mN sequentially), a graph of the displacement 5 with respect to the load F is created. Then, the primary elastic modulus is calculated using the slope obtained from the graph and the following equation (2). Since the calculated primary elastic modulus corresponds to the so-called ISM, the primary elastic modulus is appropriately referred to as P-ISM in the following description. When drawing the colored optical fiber 1, the drawing speed and the illuminance of the ultraviolet were controlled in order to adjust the P-ISM.

[Math 2]

$$P\text{-}ISM = (3F/\delta)*(\tfrac{1}{2}\pi l)*\ln(DP/DG) \quad \text{(equation (2))}$$

Here, the unit of P-ISM is [MPa]. Further, F/δ is an inclination indicated by a graph of the displacement (δ) [μm] with respect to the load (F) [gf], l is a sample length (for example, 10 mm), and DP/DG is a ratio between the outer diameter (DP) [μm] of the primary layer and the outer diameter (DG) [μm] of the cladding portion of the optical fiber. Therefore, in the case of calculating P-ISM from F, δ, and l used, it is necessary to perform predetermined unit conversion. The outer diameter of the primary layer and the outer diameter of the cladding portion can be measured by observing the cross section of the optical fiber cut by the fiber cutter with a microscope.

The "Young's modulus after additional ultraviolet irradiation" in Table 1 is the ISM of the primary layer 3 when the manufactured colored optical fiber 1 or the manufactured optical fiber ribbon was additionally irradiated with ultraviolet light at 1000 mW/cm² and 500 mJ/cm² using D bulb. Further, "change amount of Young's modulus/saturated Young's modulus" represents a ratio between a change amount of Young's modulus before and after the additional irradiation with ultraviolet light and the saturated Young's modulus. The "change amount of Young's modulus" is a value of a change amount from the "Young's modulus" to the "Young's modulus after additional ultraviolet irradiation".

"Evaluation 1" in Table 1 indicates whether or not adhesion between the bare optical fiber 2 and the primary layer 3 is maintained when a load of 70 gf is applied to the primary layer 3 during ISM measurement. When a load of 70 gf is applied to the primary layer 3, the Evaluation 1 is determined to be good (OK) when the primary layer 3 is held by the bare optical fiber 2, and the Evaluation 1 is determined to be poor (NG) when the primary layer 3 is detached from the bare optical fiber 2. The Evaluation 1 may be an indicator for determining whether the primary layer 3 can at least hold the bare optical fibers 2. "Evaluation 2" in Table 1 indicates whether or not the microbend loss in the colored optical fiber 1 or the optical fiber ribbon 100 before additional irradiation with ultraviolet light meets the standard (smaller than or equal to 0.15 dB/km). "Evaluation 3" represents whether or not the microbend loss in the colored optical fiber 1 or the optical fiber ribbon 100 after additional irradiation with ultraviolet light meets the standard (smaller than or equal to 0.15 dB/km). When the microbend loss meets the standard, the Evaluations 2 and 3 are defined to be good (OK), and when the microbend loss does not meet the standard, the Evaluations 2 and 3 are defined to be poor (NG). The "Curing rate" in Table 1 represents the ratio between the Young's modulus and the saturated Young's modulus when the first ultraviolet curing resin is formed into a film and cured at 50 mJ/cm² using a mercury lamp at room temperature, and is a value between 0 and 1.

In Example 1, a first ultraviolet curing resin having a saturated Young's modulus of 0.85 MPa was used. The first ultraviolet curing resin was ultraviolet-cured until Young's modulus of Example 1 became 0.54 MPa and the ratio of the Young's modulus to the saturated Young's modulus was 63.5% which was larger than or equal to 38% and smaller than 70%. Young's modulus after the additional ultraviolet irradiation was 0.55 MPa, and the ratio of the Young's modulus after additional ultraviolet irradiation to the saturated Young's modulus was 64.7%. The ratio of a change amount of Young's modulus to the saturated Young's modulus was 1.2% which was smaller than 27%. The curing rate was 0.84. When a load was applied to the primary layer 3, the primary layer 3 was held by the bare optical fiber 2, and the Evaluation 1 was good (OK). The microbend loss before and after the additional irradiation with ultraviolet light was smaller than or equal to 0.15 dB/km, and the Evaluations 2 and 3 were good (OK).

In Example 2, a first ultraviolet curing resin having a saturated Young's modulus of 0.79 MPa was used. The first ultraviolet curing resin was ultraviolet-cured until Young's modulus of Example 2 became 0.54 MPa and the ratio of the Young's modulus to the saturated Young's modulus was 68.4% which was larger than or equal to 38% and smaller than 70%. Young's modulus after the additional ultraviolet irradiation was 0.55 MPa, and the ratio of the Young's modulus after additional ultraviolet irradiation to the saturated Young's modulus was 69.6%. The ratio of a change amount of Young's modulus to the saturated Young's modulus was 1.3% which was smaller than 27%. The curing rate was 0.82. When a load was applied to the primary layer 3, the primary layer 3 was held by the bare optical fiber 2, and the Evaluation 1 was good (OK). The microbend loss before and after the additional irradiation with ultraviolet light was smaller than or equal to 0.15 dB/km, and the Evaluations 2 and 3 were good (OK).

In Example 3, a first ultraviolet curing resin having a saturated Young's modulus of 0.75 MPa was used. The first ultraviolet curing resin was ultraviolet-cured until Young's modulus of Example 3 became 0.29 MPa and the ratio of the Young's modulus to the saturated Young's modulus was 38.8% which was larger than or equal to 38% and smaller than 70%. Young's modulus after the additional ultraviolet irradiation was 0.49 MPa, and the ratio of the Young's modulus after additional ultraviolet irradiation to the saturated Young's modulus was 65.6%. The ratio of a change amount of Young's modulus to the saturated Young's modulus was 26.8% which was smaller than 27%. The curing rate was 0.33. When a load was applied to the primary layer 3, the primary layer 3 was held by the bare optical fiber 2, and the Evaluation 1 was good (OK). The microbend loss before and after the additional irradiation with ultraviolet light was smaller than or equal to 0.15 dB/km, and the Evaluations 2 and 3 were good (OK).

In Example 4, a first ultraviolet curing resin having a saturated Young's modulus of 0.51 MPa was used. The first ultraviolet curing resin was ultraviolet-cured until Young's modulus of Example 4 became 0.33 MPa and the ratio of the Young's modulus to the saturated Young's modulus was 64.3% which was larger than or equal to 38% and smaller than 70%. Young's modulus after the additional ultraviolet irradiation was 0.35 MPa, and the ratio of the Young's modulus after additional ultraviolet irradiation to the saturated Young's modulus was 68.2%. The ratio of a change amount of Young's modulus to the saturated Young's modulus was 3.9% which was smaller than 27%. The curing rate was 0.83. When a load was applied to the primary layer 3, the primary layer 3 was held by the bare optical fiber 2, and the Evaluation 1 was good (OK). The microbend loss before and after the additional irradiation with ultraviolet light was smaller than or equal to 0.15 dB/km, and the Evaluations 2 and 3 were good (OK).

In Example 5, a first ultraviolet curing resin having a saturated Young's modulus of 0.35 MPa was used. The first ultraviolet curing resin was ultraviolet-cured until Young's modulus of Example 5 became 0.21 MPa and the ratio of the Young's modulus to the saturated Young's modulus was 59.9% which was larger than or equal to 38% and smaller than 70%. Young's modulus after the additional ultraviolet irradiation was 0.22 MPa, and the ratio of the Young's modulus after additional ultraviolet irradiation to the saturated Young's modulus was 62.7%. The ratio of a change amount of Young's modulus to the saturated Young's modulus was 2.9% which was smaller than 27%. The curing rate was 0.75. When a load was applied to the primary layer 3, the primary layer 3 was held by the bare optical fiber 2, and the Evaluation 1 was good (OK). The microbend loss before and after the additional irradiation with ultraviolet light was smaller than or equal to 0.15 dB/km, and the Evaluations 2 and 3 were good (OK).

In Example 6, a first ultraviolet curing resin having a saturated Young's modulus of 0.30 MPa was used. The first ultraviolet curing resin was ultraviolet-cured until Young's modulus of Example 6 became 0.13 MPa and the ratio of the Young's modulus to the saturated Young's modulus was 43.4% which was larger than or equal to 38% and smaller than 70%. Young's modulus after the additional ultraviolet irradiation was 0.19 MPa, and the ratio of the Young's modulus after additional ultraviolet irradiation to the saturated Young's modulus was 63.4%. The ratio of a change amount of Young's modulus to the saturated Young's modulus was 20.0% which was smaller than 27%. The curing rate was 0.67. When a load was applied to the primary layer 3, the primary layer 3 was held by the bare optical fiber 2, and the Evaluation 1 was good (OK). The microbend loss before and after the additional irradiation with ultraviolet light was smaller than or equal to 0.15 dB/km, and the Evaluations 2 and 3 were good (OK).

In Comparative Example 1, a first ultraviolet curing resin having a saturated Young's modulus of 1.30 MPa was used. The first ultraviolet curing resin was ultraviolet-cured until Young's modulus of Comparative Example 1 became 0.95 MPa and the ratio of the Young's modulus to the saturated Young's modulus was 73.3%. Young's modulus after the additional ultraviolet irradiation was 1.29 MPa, and the ratio of the Young's modulus after additional ultraviolet irradiation to the saturated Young's modulus was 99.1%. The ratio of a change amount of Young's modulus to the saturated Young's modulus was 25.8% and the curing rate was 0.53. When a load was applied to the primary layer 3, the primary layer 3 was held by the bare optical fiber 2, and the Evaluation 1 was good (OK). The microbend loss before and after the additional irradiation with ultraviolet light was larger 0.15 dB/km, and the Evaluations 2 and 3 were poor (NG).

In Comparative Example 2, a first ultraviolet curing resin having a saturated Young's modulus of 0.71 MPa was used. The first ultraviolet curing resin was ultraviolet-cured until Young's modulus of Comparative Example 2 became 0.25 MPa and the ratio of the Young's modulus to the saturated Young's modulus was 35.0%. Young's modulus after the additional ultraviolet irradiation was 0.52 MPa, and the ratio of the Young's modulus after additional ultraviolet irradiation to the saturated Young's modulus was 73.3%. The ratio of a change amount of Young's modulus to the saturated Young's modulus was 38.3% and the curing rate was 0.23. When a load was applied to the primary layer 3, the primary layer 3 was held by the bare optical fiber 2, and the Evaluation 1 was good (OK). The microbend loss was smaller than or equal to 0.15 dB/km, and the Evaluation 2 was good (OK) but the microbend loss after the additional irradiation with ultraviolet light was larger 0.15 dB/km, and the Evaluation 3 was poor (NG).

In Comparative Example 3, a first ultraviolet curing resin having a saturated Young's modulus of 0.40 MPa was used. The first ultraviolet curing resin was ultraviolet-cured until Young's modulus of Comparative Example 3 became 0.12 MPa and the ratio of the Young's modulus to the saturated Young's modulus was 30.0%. Young's modulus after the additional ultraviolet irradiation was 0.36 MPa, and the ratio of the Young's modulus after additional ultraviolet irradiation to the saturated Young's modulus was 90.0%. The ratio of a change amount of Young's modulus to the saturated Young's modulus was 60.0% and the curing rate was 0.60. When a load was applied to the primary layer 3, the primary layer 3 was held by the bare optical fiber 2, and the Evaluation 1 was good (OK). The microbend loss was smaller than or equal to 0.15 dB/km, and the Evaluation 2 was good (OK) but the microbend loss after the additional irradiation with ultraviolet light was larger 0.15 dB/km, and the Evaluation 3 was poor (NG).

In Comparative Example 4, a first ultraviolet curing resin having a saturated Young's modulus of 0.30 MPa was used. The first ultraviolet curing resin was ultraviolet-cured until Young's modulus of Comparative Example 4 became 0.08 MPa and the ratio of the Young's modulus to the saturated Young's modulus was 26.7%. The curing rate was 0.67. When a load was applied to the primary layer 3, the primary layer 3 was peeled off from the bare optical fiber 2, and the Evaluation 1 was poor (NG).

Figure 7:
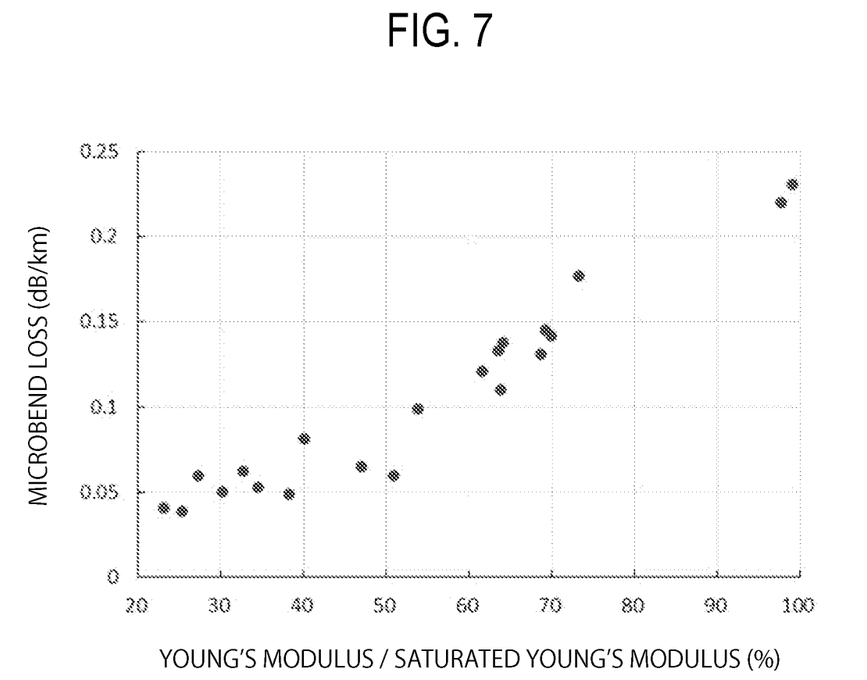
FIG. 7 is a diagram illustrating a microbend loss according to Examples and Comparative Examples.

FIG. 7 is a diagram illustrating a relationship between the ratio (%) of Young's modulus to saturated Young's modulus and the ratio (%) of Young's modulus after additional ultraviolet irradiation to saturated Young's modulus and microbend loss (dB/km). As illustrated in FIG. 7, when the ratio of the Young's modulus to the saturated Young's modulus was smaller than 70%, it was confirmed that the microbend loss of the colored optical fiber 1 became smaller than or equal to 0.15 dB/km. Therefore, the ratio of the Young's modulus to the saturated Young's modulus is preferably smaller than 70%.

In addition, the saturated Young's modulus of the primary layer 3 preferably has a relatively low saturated Young's modulus smaller than or equal to 0.85 MPa. Thus, the primary layer 3 having a sufficiently low Young's modulus can be obtained.

In addition, the ratio of the Young's modulus to the saturated Young's modulus is preferably larger than or equal to 38% and larger than or equal to 70%. Thus, it is possible to obtain the colored optical fiber 1 and the optical fiber ribbon 100 in which the bare optical fiber 2 and the primary layer 3 sufficiently adhere to each other, while suppressing microbend loss due to additional ultraviolet irradiation.

In addition, since the primary layer 3 is exposed to a high temperature in the drawing step, a curing reaction due to additional ultraviolet irradiation can be suppressed. Thus, curing of the primary layer 3 is suppressed, and curing of the primary layer 3 to near the saturated Young's modulus can be prevented.

In addition, it is preferable that the ratio of the Young's modulus after the additional ultraviolet irradiation to the saturated Young's modulus is smaller than 70%, the ratio between the amount of change in the Young's modulus before and after the additional ultraviolet irradiation and the saturated Young's modulus is smaller than 27%, and the curing rate is larger than or equal to 0.33. Thus, microbend loss due to curing of the primary layer 3 can be suppressed when additional ultraviolet light is irradiated to the manufactured colored optical fiber 1 or the optical fiber ribbon 100.

As described above, according to the present embodiment, the primary layer having a sufficiently low Young's modulus can be realized, and the microbend loss can be effectively suppressed.

The present invention is not limited to the embodiments described above, and various modifications are possible. For example, an example in which a configuration of a part of any embodiment is added to another embodiment or an example in which a configuration of a part of another embodiment is substituted is also an embodiment of the present invention. In addition, a known technique or a known technique in the technical field can be appropriately applied to a specific description or a portion not illustrated in the embodiments.

What is claimed is:

1. A colored optical fiber comprising:
a bare optical fiber;
a primary layer formed of a first ultraviolet curing resin covering the bare optical fiber; and
a secondary layer formed of a second ultraviolet curing resin covering the primary layer,
wherein a Young's modulus of the primary layer is smaller than 70% with respect to a saturated Young's modulus of the primary layer,
wherein the saturated Young's modulus of the primary layer is smaller than or equal to 0.85 MPa, and
wherein a Young's modulus after the primary layer is additionally irradiated with ultraviolet light is smaller than 70% with respect to the saturated Young's modulus of the primary layer.

2. The colored optical fiber according to claim 1, wherein the Young's modulus of the primary layer is larger than or equal to 38% with respect to the saturated Young's modulus of the primary layer.

3. The colored optical fiber according to claim 1, wherein the Young's modulus of the primary layer is larger than or equal to 0.13 MPa and smaller than or equal to 0.60 MPa.

4. The colored optical fiber according to claim 1, wherein an amount of change in a Young's modulus before and after irradiating the primary layer with ultraviolet light is less than 27% with respect to the saturated Young's modulus of the primary layer.

5. The colored optical fiber according to claim 1, wherein when a load of 70 gf is applied to the primary layer in a direction parallel to an axis of the bare optical fiber, adhesion between the bare optical fiber and the primary layer is maintained.

6. The colored optical fiber according to claim 1, wherein the first ultraviolet curing resin is ultraviolet-cured to a Young's modulus of 33% with respect to a saturated Young's modulus by irradiation with ultraviolet light of 50 mJ/cm2.

7. An optical fiber ribbon comprising:
a plurality of the colored optical fibers according to claim 1; and
an adhesive layer connecting the plurality of the colored optical fibers.

8. An optical fiber ribbon cable comprising:
the optical fiber ribbon according to claim 7 and;
a sheath accommodating the optical fiber ribbon.

9. An assembly cable of single fibers comprising:
a plurality of the colored optical fiber according to claim 1; and
a sheath accommodating the plurality of the colored optical fiber.

10. A method for manufacturing a colored optical fiber comprising:
a step of drawing a bare optical fiber from an optical fiber preform;
a step of forming a primary layer by applying a first ultraviolet curing resin around the bare optical fiber; and
a step of forming a secondary layer by applying a second ultraviolet curing resin around the primary layer and irradiating the second ultraviolet curing resin with ultraviolet light,
after manufacturing the colored optical fiber,
wherein a Young's modulus of the primary layer is smaller than 70% with respect to a saturated Young's modulus of the primary layer,
wherein the saturated Young's modulus of the primary layer is smaller than or equal to 0.85 MPa, and
wherein a Young's modulus after the primary layer is additionally irradiated with ultraviolet light is smaller than 70% with respect to the saturated Young's modulus of the primary layer.

11. The method for manufacturing a colored optical fiber according to claim 10, wherein in the step of forming the primary layer, the first ultraviolet curing resin is irradiated with ultraviolet light.

12. The method for manufacturing a colored optical fiber according to claim 10 further comprising a step of forming a colored layer by applying a third ultraviolet curing resin around the secondary layer and irradiating the third ultraviolet curing resin with ultraviolet light.

13. The method for manufacturing a colored optical fiber according to claim 10, wherein the secondary layer is colored.

14. A method for manufacturing an optical fiber ribbon comprising:
a step of preparing a plurality of the colored optical fibers according to claim 10; and
a step of connecting the plurality of colored optical fibers by applying a fourth ultraviolet curing resin to the plurality of colored optical fibers and irradiating the fourth ultraviolet curing resin with ultraviolet light.

15. A colored optical fiber comprising:
a bare optical fiber;
a primary layer formed of a first ultraviolet curing resin covering the bare optical fiber; and
a secondary layer formed of a second ultraviolet curing resin covering the primary layer,
wherein a Young's modulus of the primary layer is smaller than 70% with respect to a saturated Young's modulus of the primary layer,
wherein the saturated Young's modulus of the primary layer is smaller than or equal to 0.85 MPa, and
wherein the first ultraviolet curing resin is ultraviolet-cured to a Young's modulus of 33% with respect to a saturated Young's modulus by irradiation with ultraviolet light of 50 mJ/cm$^2$.

* * * * *